(12) United States Patent
Ashmore et al.

(10) Patent No.: US 7,174,476 B2
(45) Date of Patent: Feb. 6, 2007

(54) METHODS AND STRUCTURE FOR IMPROVED FAULT TOLERANCE DURING INITIALIZATION OF A RAID LOGICAL UNIT

(75) Inventors: Paul Ashmore, Longmont, CO (US); Theresa Segura, Broomfield, CO (US)

(73) Assignee: LSI Logic Corporation, Milpitas, CA (US)

( * ) Notice: Subject to any disclaimer, the term of this patent is extended or adjusted under 35 U.S.C. 154(b) by 578 days.

(21) Appl. No.: 10/424,939

(22) Filed: Apr. 28, 2003

(65) Prior Publication Data

US 2004/0216012 A1    Oct. 28, 2004

(51) Int. Cl.
*G06F 11/00* (2006.01)
(52) U.S. Cl. .............................................. 714/5; 714/6
(58) Field of Classification Search ..................... 714/6, 714/42, 5
See application file for complete search history.

(56) References Cited

U.S. PATENT DOCUMENTS

| | | | | |
|---|---|---|---|---|
| 4,761,785 | A | * | 8/1988 | Clark et al. .................. 714/805 |
| 5,088,081 | A | * | 2/1992 | Farr ......................... 369/47.14 |
| 5,325,375 | A | * | 6/1994 | Westberg ..................... 714/805 |
| 5,488,691 | A | * | 1/1996 | Fuoco et al. ................... 714/52 |
| 5,781,918 | A | * | 7/1998 | Lieberman et al. ............. 711/5 |
| 6,282,670 | B1 | * | 8/2001 | Rezaul Islam et al. ......... 714/6 |
| 6,467,023 | B1 | * | 10/2002 | DeKoning et al. .......... 711/114 |
| 2003/0233596 | A1 | * | 12/2003 | Corbin et al. ................... 714/5 |
| 2004/0168101 | A1 | * | 8/2004 | Kubo ............................. 714/6 |

* cited by examiner

*Primary Examiner*—Scott Baderman
*Assistant Examiner*—Joshua Lohn
(74) *Attorney, Agent, or Firm*—Duft, Bornsen & Fishman

(57) ABSTRACT

Methods and structure for improved tolerance of errors during initialization of a storage volume. More specifically, features and aspects of the invention provide for tolerating read errors during read-modify-write or read-peer-write processing of I/O requests overlapped with initialization of the volume affected by the I/O request. Features and aspects of the system detect such an error and, if the volume is being initialized, attempt graceful recovery of the error rather than shutting down or otherwise disabling the uninitialized volume.

26 Claims, 4 Drawing Sheets

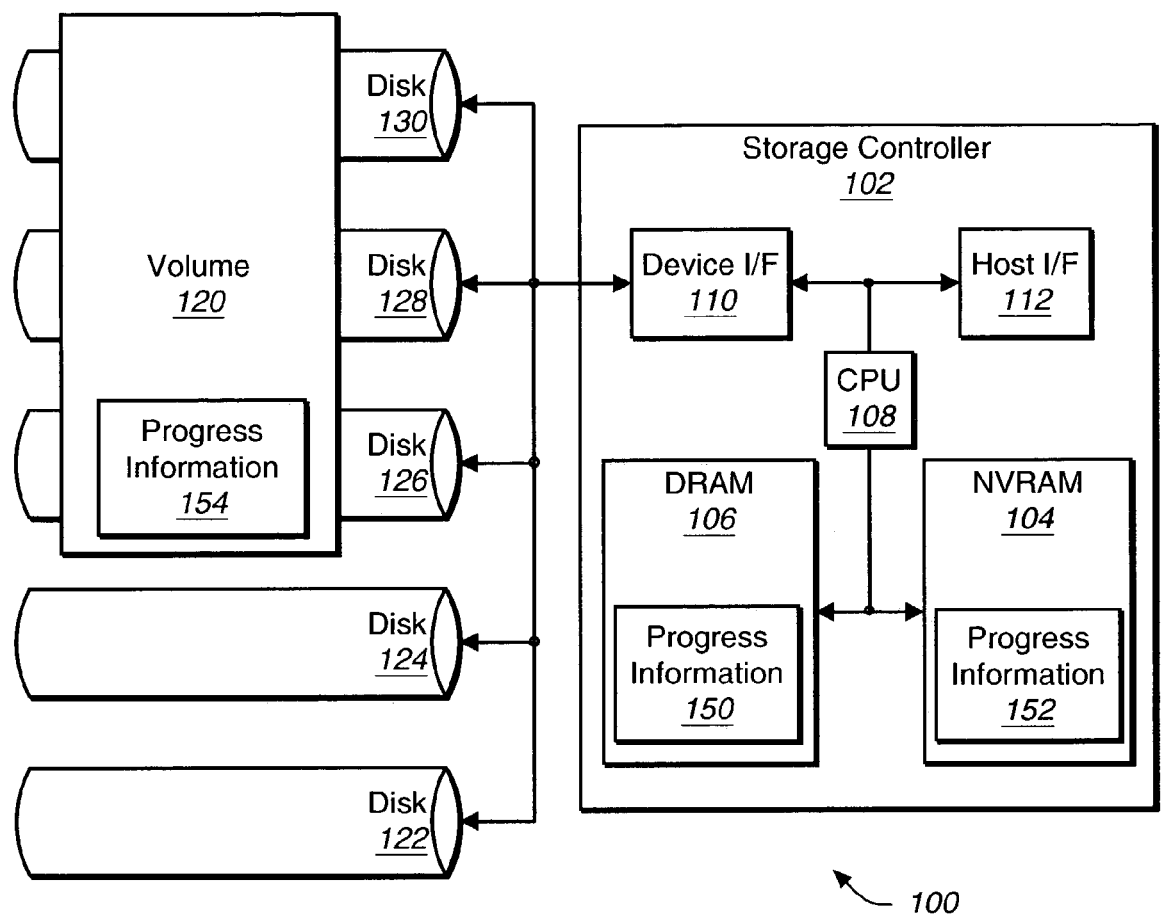
FIG._1

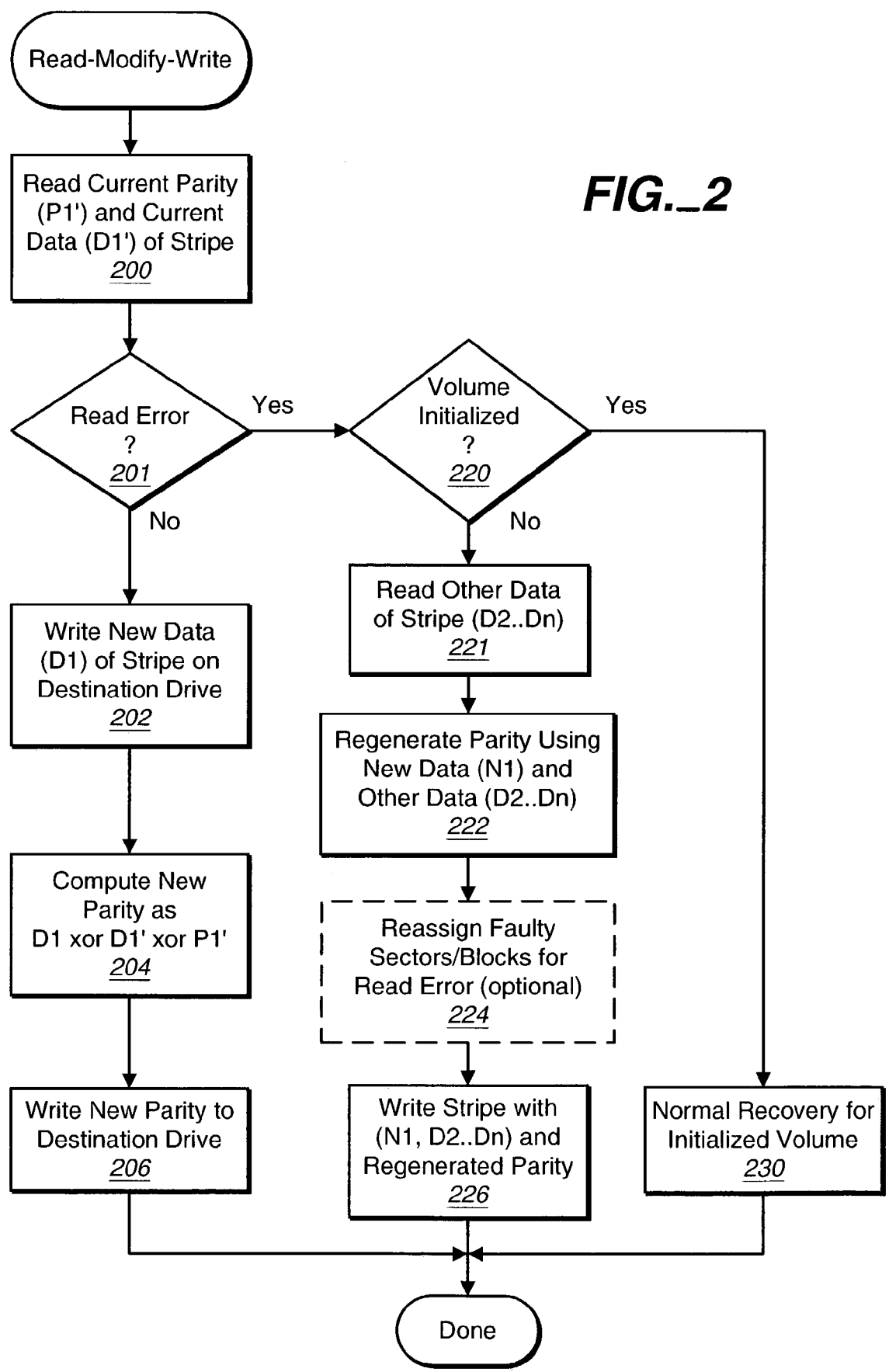
FIG._2

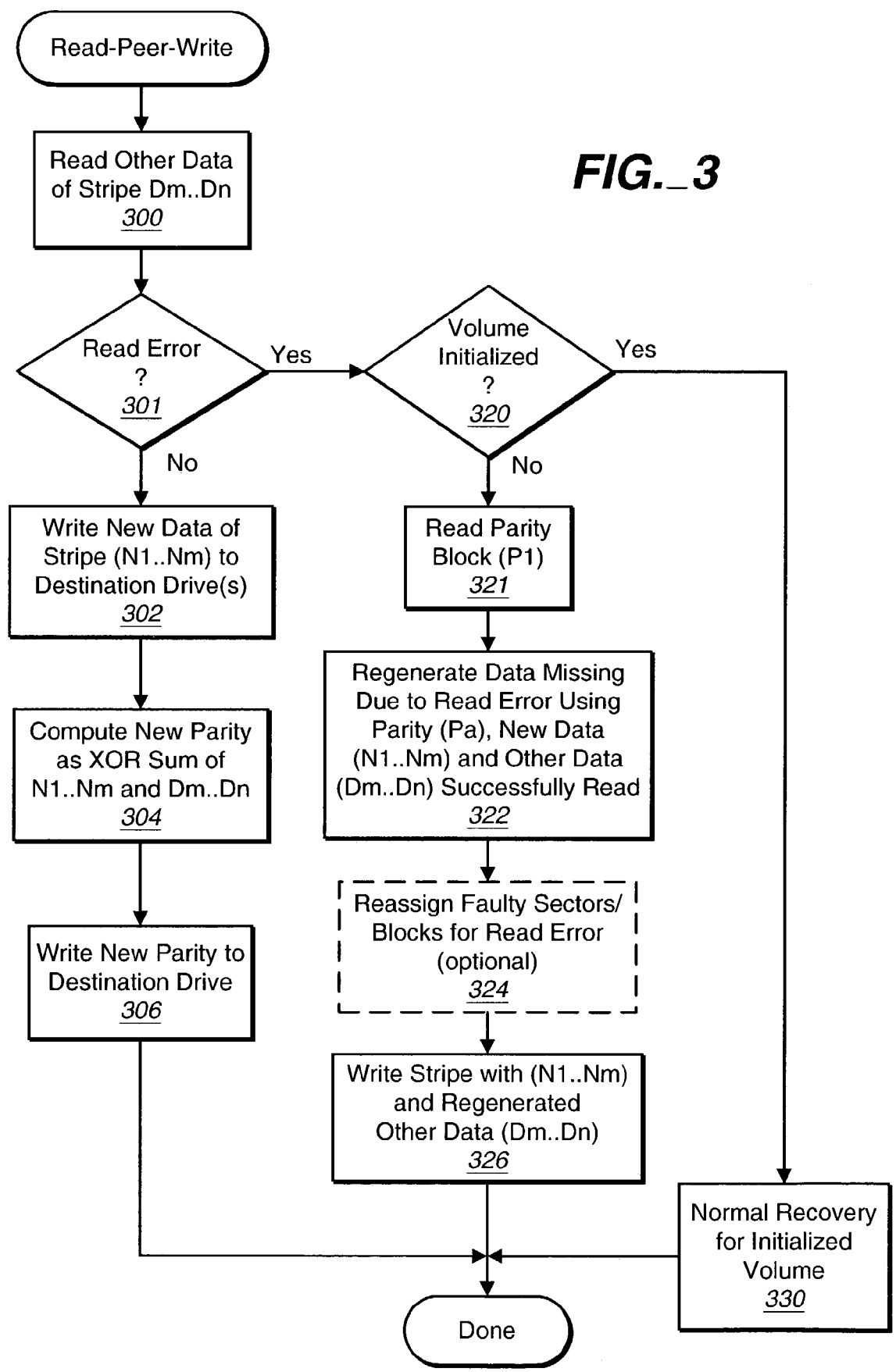
FIG._3

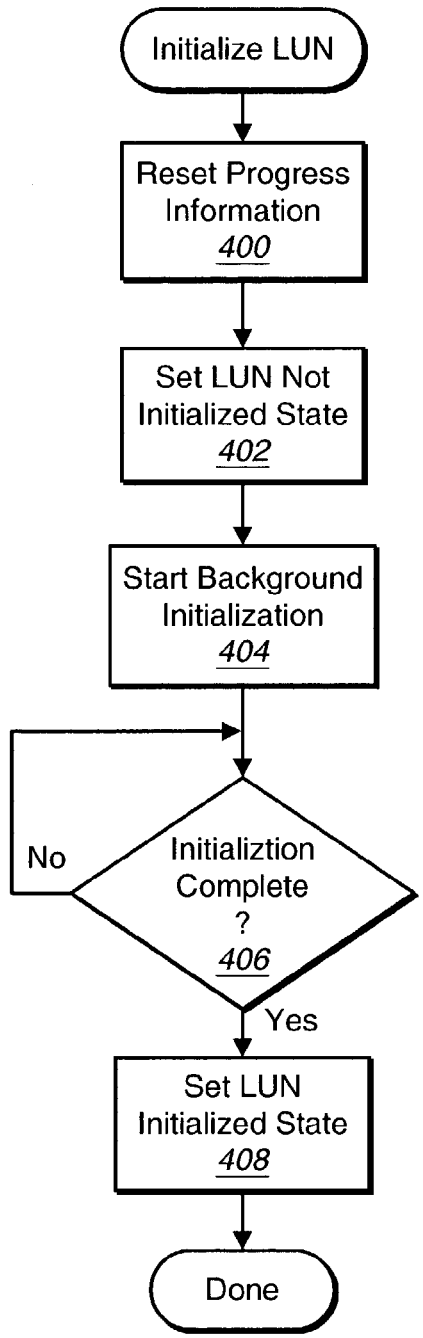
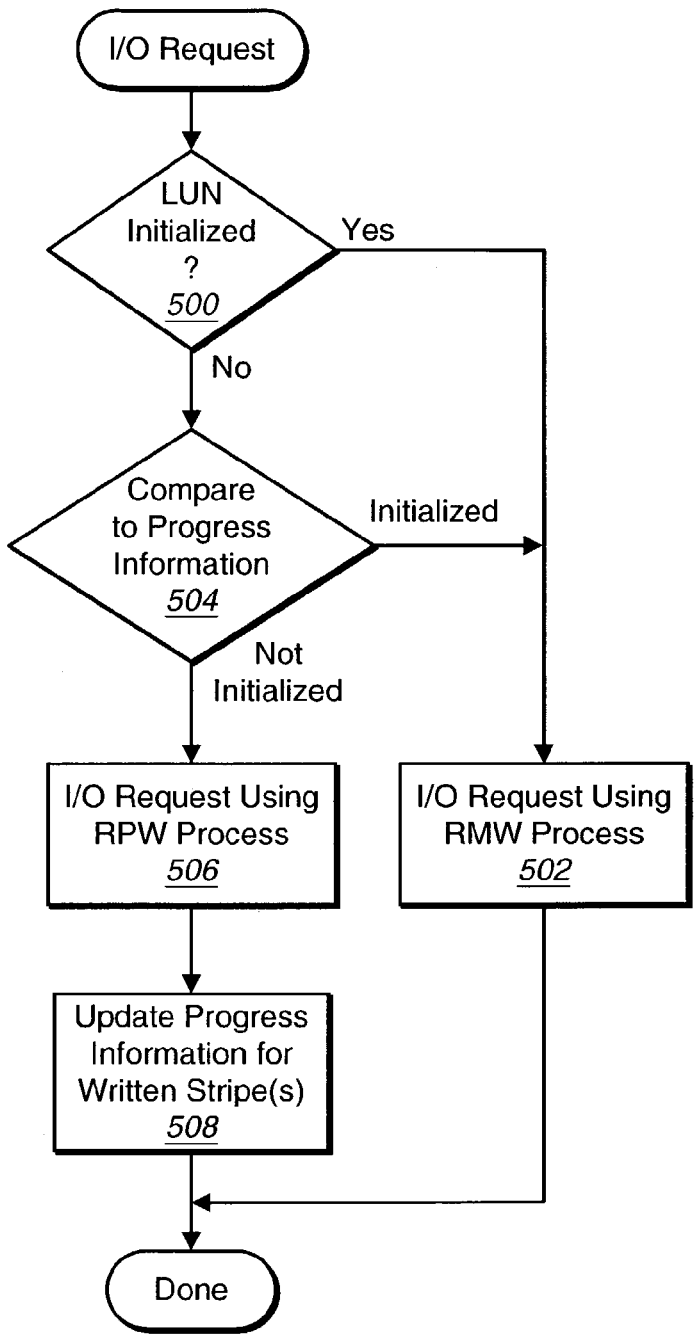
FIG._4          FIG._5

METHODS AND STRUCTURE FOR IMPROVED FAULT TOLERANCE DURING INITIALIZATION OF A RAID LOGICAL UNIT

BACKGROUND OF THE INVENTION

1. Field of the Invention

The invention relates generally to storage subsystems and more specifically relates to techniques for improving fault tolerance to read errors during I/O operations while initializing a new logical unit.

2. Related Patents

This patent is related to co-pending, commonly owned U.S. Pat. No. 6,931,499 issued 16 Aug. 2005, entitled METHOD AND APPARATUS FOR COPYING DATA BETWEEN STORAGE VOLUMES OF STORAGE SYSTEMS, incorporated herein by reference. This patent is also related to commonly owned U.S. Pat. No. 6,467,023, issued Oct. 15, 2002, entitled METHOD FOR LOGICAL UNIT CREATION WITH IMMEDIATE AVAILABILITY IN A RAID STORAGE ENVIRONMENT, incorporated herein by reference. This patent is also related to co-pending, commonly owned U.S. patent application Ser. No. 10/424,311, filed Apr. 28, 2003, publication number U.S. 2004/0215877, published Oct. 29, 2004, entitled METHODS AND STRUCTURE FOR RAPID BACKGROUND INITIALIZATION OF A RAID LOGICAL UNIT, incorporated herein by reference and also referred to here in as the "sibling" patent application.

3. Discussion of Related Art

As complexity of computing applications has evolved, so to have demands for reliability and speed in associated storage subsystems. In general, computing storage subsystems are used for storage and retrieval of programs and data associated with operation of various programs. The mission critical nature of some applications has led to corresponding demands for increased reliability in storage subsystems. Further, high-performance storage related applications, such as multimedia data capture and replay, have contributed to increased demands for performance on storage subsystems.

RAID (Redundant Array of Independent Disks) storage management techniques have been employed for some time to enhance both performance and reliability in such high-performance, high reliability storage applications. Striping techniques applied within RAID storage management distribute stored data over multiple independent disk drives thereby enhancing storage performance by distributing storage and retrieval operations over a plurality of disk drives operable in parallel. Redundancy techniques employed within RAID storage subsystems enhance reliability of the storage subsystem by generating and maintaining redundancy information associated with the user supplied data. The redundancy information ensures that failure of any single disk drive does not risk loss of data and, in some cases, allows the RAID storage subsystem to continue operation (though often in a degraded mode).

RAID storage management encompasses a number of storage management techniques for distributing data (striping) and for generating, maintaining, and distributing redundancy information over a plurality of drives. Each of these RAID management techniques is typically referred to as a "level" such as RAID level 0, RAID level 1, RAID level 5, etc. One common RAID storage management technique, often referred to as RAID level 5, distributes user data over a plurality of drives and associates therewith an additional portion of data (redundancy information) generated by use of XOR parity operations. A stripe of data consists of distributed portions of user data and the associated redundancy information. A volume or logical unit (LUN) comprises a plurality of such stripes distributed over a subset of disk drives in the storage subsystem.

Typically a RAID controller, often integrated within the storage subsystem, applies RAID storage management techniques to store and retrieve such stripes on the disk drives of the storage subsystem. The RAID storage controller hides from the host systems information relating to the specific locations of individual portions of data and hides information regarding generation and maintenance of the required redundancy information. To an attached host computing system, the RAID storage controller makes a volume or logical unit appear essentially as a single, highly reliable, high-performance, high-capacity disk drive. In general, the RAID storage controller provides a mapping function from logical addresses or locations specified in host I/O requests to physical storage locations corresponding to the striped information distributed over multiple disks.

In RAID level 5 storage management (as well as other forms of RAID storage management such as RAID levels 6) it is important that a newly defined storage volume be made "XOR consistent". XOR consistency as used herein refers to the state of each stripe such that the data in the stripe and the associated redundancy information are consistent—i.e., the parity information corresponds to the associated data of the stripe. While RAID level 5 uses XOR parity, "XOR consistent" as used herein also refers to any redundancy information stored in the array of disk drives that make up a volume. For example, XOR consistent may also refer to the redundancy information used in RAID level 6 and the mirrored redundancy information used in RAID level 1. Therefore, although the problems presented herein are discussed in detail with respect to RAID level 5, similar problems are encountered in other RAID management levels where a new volume must be initialized to make the redundant information ready for use.

When a new volume is defined by allocating portions of storage capacity distributed over a plurality of drives, the volume may initially include random data leftover from previous utilization of the disk drives or generated from some other source. In general, the initial information on a newly defined storage volume will not be XOR consistent.

Various techniques are known to make a newly defined volume XOR consistent. A new solution addressed in the sibling patent application proposes to overlap I/O request processing with initialization of a new volume. So called read-modify-write and read-peer-write processing (discussed further herein below) is used to processing I/O requests overlapped with initialization of a volume. These processing techniques entail reading portions of a stripe to be updated in response to an I/O write request overlapping volume initialization. The read portions and the new data are applied to generate updated parity information. The new data and updated parity information are then written to the disk drives of the system.

Problems arise in using such processing techniques if certain errors occur during volume initialization. Most present storage systems are unable to recover from an error during the read portion of a read-modify-write or read-peer-write process performed during initialization of a volume. Present techniques simply disable the volume on which the error occurred if the read error occurs during the initialization process. Disabling the volume may require administrative intervention to permit continued operation of the volume. Such interruption of service of the storage system may be undesirable in a number of applications.

It is evident from the above discussion that an ongoing problem exists in making a newly defined RAID volume available for host I/O request processing as soon as possible while maintaining tolerance of faults.

SUMMARY OF THE INVENTION

The present invention solves the above and other problems, thereby advancing the state of the useful arts, by providing methods and structure for tolerating read errors in I/O request processing that overlaps background initialization of a new storage volume. More specifically, aspects and features of the invention provide for regeneration of data missing in the read-modify-write or read-peer-write process due to a read error in the I/O request processing during initialization of the affected volume.

A first feature of the invention therefore provides a method for initializing a storage volume comprising: making the volume XOR consistent; processing an I/O request received from an attached host system substantially in parallel with the step of making the volume XOR consistent; detecting a read error caused by a read operation on the storage volume wherein the read error is detected during the making of the storage volume XOR consistent; and recovering from the read error during the process of making the volume XOR consistent.

Another aspect of the invention further provides that the step of making the volume XOR consistent includes: generating the read operation that caused the read error.

Another aspect of the invention further provides that the step of processing an I/O request includes: generating the read operation that caused the read error.

Another aspect of the invention further provides that the step of recovering includes: regenerating portions of a stripe missing due to the read error using other portions of the stripe.

Another aspect of the invention further provides that the step of processing includes: processing the I/O request using read-modify-write processing such that the read error is generated when attempting to read previous redundancy information, and provides that the step of recovering includes: reading other data from the volume wherein the other data is associated with the redundancy information; regenerating the redundancy information from associated other data; and writing the regenerated redundancy information to the volume.

Another aspect of the invention further provides that the step of recovering further includes: reassigning locations on the volume related to the read error in response to detecting the read error to avoid using faulty locations of the volume.

Another aspect of the invention further provides that the step of processing includes: processing the I/O request using read-peer-write processing such that the read error is generated when attempting to read a portion of other data to generate associated redundancy information, and provides that the step of recovering includes: reading present redundant information from the volume; regenerating the portion of other data from associated redundant information; and writing the regenerated portion of other data to the volume.

Another aspect of the invention further provides that the step of recovering further includes: reassigning locations on the volume related to the read error in response to detecting the read error to avoid using faulty locations of the volume.

BRIEF DESCRIPTION OF THE DRAWINGS

FIG. 1 is a block diagram of a system embodying features and aspects of the present invention.

FIG. 2 is a flowchart of a read-modify-write process.

FIG. 3 is a flowchart of a read-peer-write process.

FIG. 4 is a flowchart of a process to initialize a volume.

FIG. 5 is a flowchart of a process to handle host system I/O requests.

DETAILED DESCRIPTION OF THE DRAWINGS

FIG. 1 is a block diagram of a storage system 100 advantageously applying features and aspects of the present invention to improve tolerance of read errors detected during initialization of a storage volume within the storage system. Storage system 100 may include a plurality of disk drives 122 through 130. Storage controller 102 manages interaction with the disk drives to achieve desired reliability, performance and host interaction. Volume 120 may be defined by such a storage controller 102 as a logical partition of the available storage space defined by disks 122 through 130. In general, such a volume 120 comprises a portion of the capacity of one or more of the available disk drives in the storage system. The portion may comprise any fraction of the available capacity of each disk drive up to and including the entirety of each disk drive. As shown in FIG. 1, exemplary volume 120 comprises a portion of each of disk drives 126, 128 and 130.

Storage controller 102 may include a CPU 108 for controlling operation of the controller and overall management of the storage system. CPU 108 may be coupled to memory 106 for storage and retrieval of information. Information stored in such memory may include program instructions, cache data buffers, and initialization progress information 150 (as discussed further in the sibling patent application). CPU 108 may also store information in nonvolatile memory (NVRAM) 104. Examples of information stored in such a nonvolatile memory may include configuration information and initialization progress information 152 (as discussed further in the sibling patent application).

CPU 108 may also be coupled to host computing systems (not shown) via host interface 112. Still further, CPU 108 may be coupled to disk drives 122 through 130 via device interface 110. Host interface 112 couples the storage controller 102 to any of a number of well-known, commercially available or customized communication media for exchanging information with attached host systems. Exemplary of such communication media are Fibre Channel, parallel SCSI, etc. Still further, storage controller 102 is coupled through device interface 110 to disk drives 122 through 130 via any of several well-known, commercially available or customized communication media. Examples of such communication media for exchange of information between storage controller 102 and disk drives 122 through 130 are Fibre Channel, parallel SCSI, Infiniband, etc. Those of ordinary skill in the art will readily recognize numerous equivalent communication media and protocols for coupling a storage subsystem storage controller 102 to attached host systems and to disk drives within the storage subsystem. Further, those of ordinary skill in the art will readily recognize numerous equivalent structures for the design of storage controller 102. Additional components may be resident within such a storage controller and may be interconnected using any of several structures as well-known in the art. In addition, those of ordinary skill in the art will recognize that in high reliability and/or high-performance storage system applications, it may be common to utilize multiple storage controller devices for improved reliability through redundancy, for improved performance through parallel operation, or both. Is also common that redundant communication media paths may be employed to improve reliability and performance. FIG. 1 is therefore merely intended as exemplary of one possible storage system configuration in which features and aspects of the present invention may be beneficially applied.

As discussed further in the sibling patent application, in FIG. 1 it may be noted that initialization progress information may be stored in the various memory devices associated with the storage subsystem. According to features and aspects of the sibling patent application, initialization progress information 150 may be generated and maintained within memory 106, progress information 152 may be maintained within nonvolatile memory 104 and progress information 154 may be maintained on a portion of volume 120. Features and aspects of the sibling patent application generally provide for improved operations for initialization of volume 120. The sibling patent application also discusses techniques for initializing a newly defined storage volume. In particular, RAID storage volumes must be made "XOR consistent" as defined in the sibling patent application.

Storage controller 102 of FIG. 1 is generally operable to perform such initialization of a newly defined volume 120 and to process I/O requests substantially in parallel with such initialization. Aspects and features discussed in the sibling patent application describe processes to achieve such substantial overlap. FIG. 4 is a flowchart describing a simplified method for initializing a newly defined volume (LUN) as a background process while allowing processing of I/O requests in parallel therewith. Additional details of such an initialization sequence are provided in the sibling patent application. Element 400 is first operable to reset progress information regarding the initialization process. As discussed further in the sibling patent application, progress information may include a threshold or watermark indicator indicative of the progress of background initialization. Element 402 is then operable to set state information indicating that the volume or LUN being initialized is not presently initialized. This state information may be used as discussed further herein below to adapt processing of I/O requests as required for an initialized vs. uninitialized volume. Element 404 is operable to commence background processing of the initialization task for the newly defined volume. Initialization of the newly defined volume proceeds as a background task in parallel with processing of I/O requests from attached host systems. Background volume initialization and I/O request processing are coordinated through updates to the progress information initially reset by operation of element 400. Element 406 then awaits indication that the background initialization processing is completed. When the background initialization is complete, element 408 sets an initialized status to indicate the completion.

As noted in the sibling patent application, progress information is maintained during the initialization process to indicate progress of the background initialization. This progress information may include a threshold or watermark indicator of the progress of initialization process. Additional details of exemplary processing to perform background initialization are provided in the sibling application.

FIG. 5 is a flowchart describing operation of an exemplary I/O request processing method. As noted elsewhere herein, I/O request processing may proceed in parallel with the background initialization process. In particular, the process of FIG. 5 is operable in response to receipt of an I/O write request from an attached host system. Element 500 first determines if the affected logical unit (volume) has already completed initialization (i.e., is in an initialized state as discussed above). If the volume has been initialized, element 502 is operable to perform normal I/O request processing using read-modify-write (RMW) or other I/O request processing techniques for standard I/O write request processing. If element 500 determines that the affected volume has not yet been fully initialized, element 504 is next operable to inspect threshold or watermark progress information discussed above to determine whether the initialization process has progressed sufficiently to initialize the area affected by the present I/O request. If so, element 502 is operable as above to complete the I/O request processing using RMW or other I/O write processing techniques. If element 504 determines that the affected portion of the volume has not yet been initialized, element 506 is operable to perform the desired I/O write request using read-peer-write processing as discussed further below. Read-peer-write processing, though slower than standard RMW processing, ensures that the affected stripe will be made XOR consistent by virtue of the I/O request processing. Element 508 is then operable to update the progress information to indicate the stripes affected by processing of the I/O write request.

As discussed above, I/O request processing may use RMW processing techniques or read-peer-write (RPW) processing techniques. FIG. 2 is a flowchart describing an exemplary RMW operation. In general, an RMW operation is used for writing information on a stripe of a RAID storage subsystem that is already initialized with valid data such that redundancy information must be updated in response to the updating of a portion of associated stripe data. For example, in a RAID level 5 or RAID level 6 storage volume, a stripe consists of a number of blocks or portions of data, each block on one of the plurality of disk drives associated with the volume. In addition, the stripe includes redundancy information associated with the data portion of the stripe. Where an I/O request writes to a portion of the data of a stripe in a volume, RMW processing may be invoked to rapidly update the affected data and redundancy portions of the stripe.

Element 200 of FIG. 2 is first operable to read the current parity portion of the affected stripe (P1') and the present data portion (D1') to be updated by the RMW process. The I/O request may update only a portion of the stripe represented as new data D1. That portion may span one or more disk drives of the volume. Element 201 next determines whether a read error occurred during the read of the parity portion or current data portion by element 200. If not, element 202 then writes the new data portion (D1) of the stripe on the appropriate destination drive or drives of the storage system. Element 204 then computes a new parity portion of the stripe as the XOR sum of the modified data portion (D1), the previous parity information (P1') and the original data portion now updated (D1'). Element 206 completes the normal RMW processing by writing the newly computed parity information to the appropriate destination drives of the storage system.

If element 201 determines that a read error occurred during the parity portion read of element 202, element 220 next determines whether the error occurred before the volume had completed initialization. If the volume is initialized, element 230 completes the RMW processing by performing normal recovery processing for the read error. Standard recovery techniques may include degraded mode performance of the volume and regeneration of any missing data. In particular, where RAID redundancy techniques are applied, erroneous information is regenerated from the remaining valid data (if any) and the redundancy information (if any).

If element 220 determines that the read error occurred before the volume was initialized, element 221 is operable to read other data of the stripe. Element 222 is then operable to generate redundancy information using the newly written data and other data of the stripe successfully read. Optionally (as indicated by the dashed lines of the element), element 224 may then reassign the faulty block on the disk that caused the read error to avoid that possibly flawed area of the disk. Element 226 then writes the stripe with regenerated information to the disk drives of the system. Unlike prior techniques that would fail or disable further use of the volume when such a fault was incurred during initialization, the method of FIG. 2 allows the volume operation to continue. Tolerating such read errors during initialization provides an advance over the present know techniques and systems.

FIG. 3 describes a method for RPW processing of an I/O request. Where the redundancy information of an affected stripe is not presently known to be XOR consistent, an RPW operation will ensure that the stripe becomes XOR consistent by virtue of the write operations. In general, an RPW process writes the entire stripe including all data and the corresponding computed redundancy (parity) information corresponding thereto.

Element 300 first reads the other data of the affected stripe (Dm . . . Dn). Element 301 then determines whether a read error occurred during the read operations of element 300 of the RPW process. If not, element 302 writes the new data portion of the affected stripe to appropriate destination drives. New data overwriting affected portions of the stripe are denoted as N1 . . . Nm. Element 304 is operable to compute parity for the affected stripe as the XOR sum of the new data portions (N1 . . . Nm) and other data portions (Dm . . . Dn). Lastly, element 306 is operable to write the newly computed parity (redundancy information) to an appropriate destination drive for the affected stripe. Where the new data (N1 . . . Nm) represents the entirety of the stripe, hence no additional portions of data need be read by operation of element 300, the RPW operation is then often referred to as a full stripe write operation.

If element 301 determines that a read error occurred during the other data portion read of element 300, element 320 next determines whether the read error occurred before the volume had completed initialization. If the volume is initialized, element 330 completes the RPW processing by performing normal recovery processing for the read error. Standard recovery techniques to regenerate missing information and including degraded mode operation of the volume are known to those of ordinary skill in the art. In particular, where RAID redundancy techniques are applied, erroneous information is regenerated from the remaining valid data (if any) and the redundancy information (if any).

If element 320 determines that the read error occurred before the volume was initialized, element 321 is operable to read the parity block (denoted P1) corresponding to the stripe in which the read error occurred. Element 322 is operable to regenerate the missing data using the read parity (P1), the newly written data (N1 . . . Nm) and other readable portions of the stripe (Dm . . . Dn portions read without error). Optionally, element 324 may then reassign the faulty block/blocks on the disk that caused the read error to avoid continued use of a possibly flawed area of the disk. Element 326 then writes the stripe with regenerated information to the disk drives of the system. Unlike prior techniques that would fail or disable further use of the volume when such a fault was incurred during initialization, the method of FIG. 3 allows the volume operation to continue. Tolerating such read errors during initialization provides an advance over the present know techniques and systems.

The RMW processing of FIG. 2 and the RPW processing of FIG. 3 may be readily adapted by those of ordinary skill in the art to process multiple stripes where some of the multiple stripes are processed as "full stripe" write operations and other partial stripe modifications may be processed either as RMW or RPW operations. Further, those skilled in the art will recognize that although the methods of FIGS. 2 and 3 are described in terms of typical RAID level 5 configurations, other storage management techniques are similarly applicable. So long as the read error detected in the RMW or RPW I/O request processing is recoverable, the exemplary methods above will recover the error during the volume initialization process so as to avoid disabling further operation of the volume.

While the invention has been illustrated and described in the drawings and foregoing description, such illustration and description is to be considered as exemplary and not restrictive in character. One or more exemplary embodiments of the invention and minor variants thereof have been shown and described. Protection is desired for all changes and modifications that come within the spirit of the invention. Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method for initializing a storage volume comprising:
making the volume XOR consistent;
processing an I/O request received from an attached host system substantially in parallel with the step of making the volume XOR consistent;
detecting a read error caused by a read operation on the storage volume wherein the read error is detected during the making of the storage volume XOR consistent; and
recovering from the read error during the process of making the volume XOR consistent without terminating the step of making the volume XOR consistent.

2. The method of claim 1 wherein the step of making the volume XOR consistent includes:
generating the read operation that caused the read error.

3. The method of claim 1 wherein the step of processing an I/O request includes:
generating the read operation that caused the read error.

4. The method of claim 1 wherein the step of recovering includes:
regenerating portions of a stripe missing due to the read error using other portions of the stripe.

5. The method of claim 1
wherein the step of processing includes:
processing the I/O request using read-modify-write processing such that the read error is generated when attempting to read previous redundancy information,
and wherein the step of recovering includes:
reading other data from the volume wherein the other data is associated with the redundancy information;
regenerating the redundancy information from associated other data; and
writing the regenerated redundancy information to the volume.

6. The method of claim 5 wherein the step of recovering further includes:

reassigning locations on the volume related to the read error in response to detecting the read error to avoid using faulty locations of the volume.

7. The method of claim 1
wherein the step of processing includes:
processing the I/O request using read-peer-write processing such that the read error is generated when attempting to read a portion of other data to generate associated redundancy information,
and wherein the step of recovering includes:
reading present redundant information from the volume;
regenerating the portion of other data from associated redundant information; and
writing the regenerated portion of other data to the volume.

8. The method of claim 7 wherein the step of recovering further includes:
reassigning locations on the volume related to the read error in response to detecting the read error to avoid using faulty locations of the volume.

9. A method operable in a RAID storage subsystem comprising:
processing I/O requests received from an attached host system;
initializing a volume to make the volume XOR consistent substantially in parallel with the step of processing the I/O request; and
correcting media read errors detected during the initialization of the volume without terminating the step of initializing the volume.

10. The method of claim 9 wherein the step of processing includes: processing the I/O requests using read-modify-write processing techniques.

11. The method of claim 10 wherein the step of correcting includes:
detecting the read error as a result of a read operation associated with read-modify-write processing of the I/O requests.

12. The method of claim 9 wherein the step of processing includes:
processing the I/O requests using read-peer-write processing techniques.

13. The method of claim 12 wherein the step of correcting includes:
detecting the read error as a result of a read operation associated with read-modify-write processing of the I/O requests.

14. A system for initializing a storage volume comprising:
means for making the volume XOR consistent;
means for processing an I/O request received from an attached host system substantially in parallel with the step of making the volume XOR consistent;
means for detecting a read error caused by a read operation on the storage volume wherein the read error is detected during the making of the storage volume XOR consistent; and
means for recovering from the read error during the process of making the volume XOR consistent without terminating operation of the means for making the volume XOR consistent.

15. The system of claim 14 wherein the means for making the volume XOR consistent includes:
means for generating the read operation that caused the read error.

16. The system of claim 14 wherein the means for processing an I/O request includes:
means for generating the read operation that caused the read error.

17. The system of claim 14 wherein the means for recovering includes:
means for regenerating portions of a stripe missing due to the read error using other portions of the stripe.

18. The system of claim 14
wherein the means for processing includes:
means for processing the I/O request using read-modify-write processing such that the read error is generated when attempting to read previous redundancy information,
and wherein the means for recovering includes:
means for reading other data from the volume wherein the other data is associated with the redundancy information;
means for regenerating the redundancy information from associated other data; and
means for writing the regenerated redundancy information to the volume.

19. The system of claim 18 wherein the means for recovering further includes:
means for reassigning locations on the volume related to the read error in response to detecting the read error to avoid using faulty locations of the volume.

20. The system of claim 14
wherein the means for processing includes:
means for processing the I/O request using read-peer-write processing such that the read error is generated when attempting to read a portion of other data to generate associated redundancy information,
and wherein the means for recovering includes:
means for reading present redundant information from the volume;
means for regenerating the portion of other data from associated redundant information; and
means for writing the regenerated portion of other data to the volume.

21. The system of claim 20 wherein the means for recovering further includes:
means for reassigning locations on the volume related to the read error in response to detecting the read error to avoid using faulty locations of the volume.

22. A computer readable storage medium tangibly embodying program instructions for a method operable in a RAID storage subsystem, the method comprising:
processing I/O requests received from an attached host system;
initializing a volume to make the volume XOR consistent substantially in parallel with the step of processing the I/O request; and
correcting media read errors detected during the initialization of the volume without terminating the step of initializing the volume.

23. The medium of claim 22 wherein the method step of processing includes:
processing the I/O requests using read-modify-write processing techniques.

24. The medium of claim 23 wherein the method step of correcting includes:
detecting the read error as a result of a read operation associated with read-modify-write processing of the I/O requests.

25. The medium of claim 22 wherein the method step of processing includes:
processing the I/O requests using read-peer-write processing techniques.

26. The medium of claim 25 wherein the method step of correcting includes:
detecting the read error as a result of a read operation associated with read-modify-write processing of the I/O requests.

* * * * *